United States Patent [19]

Piotrowski

[11] Patent Number: 5,181,304
[45] Date of Patent: Jan. 26, 1993

[54] ADJUSTABLE ALIGNMENT ASSEMBLY AND METHOD

[75] Inventor: Tadeusz W. Piotrowski, Cincinnati, Ohio

[73] Assignee: Cincinnati Milacron, Inc., Cincinnati, Ohio

[21] Appl. No.: 730,548

[22] Filed: Jul. 16, 1991

[51] Int. Cl.⁵ .............................................. B25B 27/14
[52] U.S. Cl. ........................................ 29/271; 29/464; 29/468
[58] Field of Search ..................... 29/271, 281.5, 464, 29/466, 468

[56] References Cited

U.S. PATENT DOCUMENTS

| | | | |
|---|---|---|---|
| 3,261,086 | 7/1966 | Dunn | 29/468 X |
| 3,336,653 | 8/1967 | Symons | 29/271 |
| 3,550,672 | 12/1970 | Fastert et al. | 29/271 X |
| 3,685,126 | 8/1972 | Kane | 29/271 X |
| 4,071,941 | 2/1978 | Sweet | 29/468 |
| 4,164,064 | 8/1979 | Reavill | 29/468 |
| 4,310,963 | 1/1982 | Blumle | 29/464 X |
| 4,570,320 | 2/1986 | Kile | 29/271 |
| 4,598,453 | 7/1986 | Wills | 29/271 |
| 4,642,212 | 2/1987 | Bailey | 29/458 X |
| 4,861,085 | 8/1989 | Lock et al. | 29/281.5 X |
| 4,956,913 | 9/1990 | Eck | 29/468 X |
| 4,967,471 | 11/1990 | Noguchi et al. | 29/281.5 X |

Primary Examiner—Timothy Eley
Assistant Examiner—C. Richard Martin
Attorney, Agent, or Firm—Frost & Jacobs

[57] ABSTRACT

An alignment system and method wherein a machine module is aligned with and secured to a machine base. A plate is loosely held on the module by screws, and the base and plate have mating pin holes. A pin is inserted through the mating pin holes, and the plate moves to find its aligned position. The screws are then tightened to fix the plate on the module, and the pin is removed. Subsequent realignment can be easily accomplished by reinsertion of the alignment pin to insure registration between the preset plate and base pin holes.

10 Claims, 2 Drawing Sheets

ADJUSTABLE ALIGNMENT ASSEMBLY AND METHOD

TECHNICAL FIELD

This invention relates generally to an assembly and method for simplifying accurate reassembly and re-alignment of machine tools and the like, and, more particularly, to an assembly utilizing alignment pins and bores in alignable machine units, whereby initial factory alignment can be accurately and quickly repeated in the field by relatively unskilled assemblers.

BACKGROUND OF THE INVENTION

Large machine tools such as lathes, grinders and milling machines, and the like, must often be assembled where manufactured, then disassembled for transportation and reassembled at another site. In order to insure the most accurate reassembly and alignment of various parts of such devices, alignment fixtures, gibs, templates and other well-known arrangements have been utilized in industry.

It is common to provide in a base member, several close-tolerance alignment holes which receive removable alignment pins, along with less-accurate threaded openings which receive anchoring bolts for attachment of a mounted sub-unit. Preferred processing would be for the sub-unit to arrive at the assembly area with previously-machined mating close-tolerance holes, for final pinning with the base member. This technique works for small caps and parts, but large spacings of pin holes are frequently difficult to maintain in production machining procedures, especially when mating parts include many machining operations which inherently result in cumulative tolerance buildups which must be adjusted-out during final assembly. In these instances, assembled parts are drilled and reamed together for accommodating, for example, tapered pins. The pins may be removed and the assembly torndown and reassembled, using the tapered pins, with no loss in accuracy. Replacement units, however, will generally not match, and the entire alignment and pin-fixing technique must be performed by skilled assemblers, often at the field site.

Additionally, pin holes are often difficult to drill and ream during assembly, consuming time and generally contaminating the area and assembled devices with chips and debris.

DISCLOSURE OF THE INVENTION

It is an object of this invention to provide an alignment assembly and method which enables accurate and repeatable alignment quality while allowing for normal manufacturing and assembly tolerances.

It is also an object of this invention to provide a relatively simple alignment assembly and procedure which can be accurately preset by skilled assemblers, and used during subsequent reassembly or other alignment procedures by relatively unskilled assemblers without compromising accuracy.

It is another object of the present invention to provide an alignment system whereby plural sub-units (ultimately destined for the same mounting surface of a machine) may be set to a master aligning fixture, by highly skilled assemblers, yet be subsequently assembled with the mounting surface in the field by lower skilled personnel.

It is another object of the present invention to provide an improved alignment assembly and method for large machine tools and the like which must occasionally be disassembled for transportation, maintenance, repair, or replacement of units, then accurately reassembled and aligned within acceptable tolerances in a quick and efficient manner by relatively unskilled assemblers.

In accordance with one aspect of the present invention, there is provided an adjustable assembly for aligning a machine tool module on the mounting surface of a base element, wherein the machine tool module includes an attachment portion and the base comprises a plurality of alignment bores. The assembly includes a removable alignment pin to be fit within an alignment bore of the base element. The attachment portion includes an access hole having a shape generally corresponding to the shape of the alignment pin, and being oversized relative to the pin in order to provide a predetermined amount of space between the hole and the inserted pin. An adjustable alignment plate has a bore which precisely receives the alignment pin, and is adjustably attached to the attachment portion with its bore generally aligned with the access hole. Once the machine tool module is properly aligned in its assembly position, the alignment pin is inserted through the access hole of the attachment portion, through the bore of the adjustable alignment plate, and into the alignment bore of the base. During insertion of the pin, the alignment plate is movably secured to the attachment portion, so that insertion of the alignment pin precisely aligns the plate bore with the alignment bore of the base. The alignment plate is then tightly secured to the module attachment portion, and the alignment pin may be removed. Subsequent alignment procedures merely entail positioning the machine tool module relative to the base such that the alignment pin can be reinserted through the plate bore and into the alignment bore of the base.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
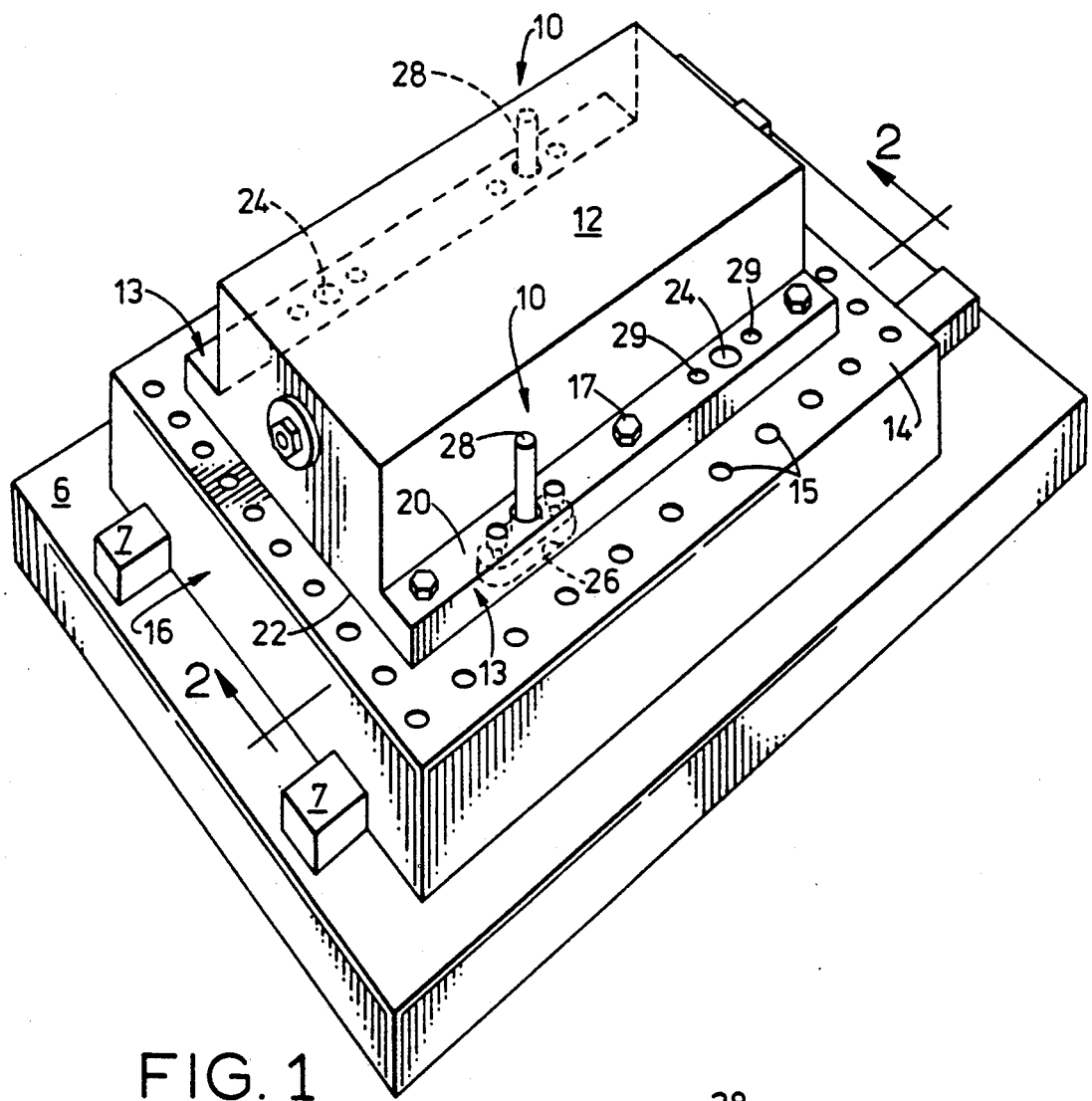
FIG. 1 is a partial perspective view of a machine tool arrangement embodying a plurality of adjustment assemblies made in accordance with the present invention.

Referring now to the drawings in detail, wherein like numerals indicate the same elements throughout the views, FIG. 1 illustrates a preferred arrangement of a plurality of adjustable assemblies 10 for aligning a machine tool module 12 on a mounting surface 14 of a machine base element 16. While the mounting surface 14 is shown as a horizontal plane, its specific attitude is relative unimportant. Machine tool module 12 can be any of a variety of machine parts such as a spindle housing, headstock, tool turret, etc. Base element 16 is, in this case, arranged upon a machine mounting surface 6, for slidable motion along a pair of guideways 7. Additionally, sub-unit or machine module 12 is to be aligned with respect to some reference, for example, guideways 7.

Base element 16 includes a plurality of closely-toleranced base alignment bores 15 formed therein. Bores 15 are each oriented normal to mounting surface 14 along a central axis A, and may be provided in the form of reamed pin holes which might be found in a reconfigurable or universal-type machine tool.

Module 12 includes a pair of oppositely disposed attachment portions or flanges 13, each having a top surface 20 and a bottom surface 22, and module 12 is secured on mounting surface 14 by a plurality of bolts 17. The alignment procedure generally requires substantial skill, experience and attention to accuracy, and must be done during initial assembly of the machine (usually at its place of manufacture) and any time the module is replaced or rebuilt. While alignment bores 15 of mounting surface 14 and the holes 24 of module 12 would usually be precisely-machined to closely register with one another once module 12 is in proper alignment, cumulative machining and assembly tolerances often result in varying degrees of misalignment. Adjustable assembly 10 of the present invention accommodates these tolerances and insures precise registration between base alignment bores 15 and corresponding alignment bores 34 of the adjustable assemblies 10 (e.g., see FIG. 4).

Figure 2:
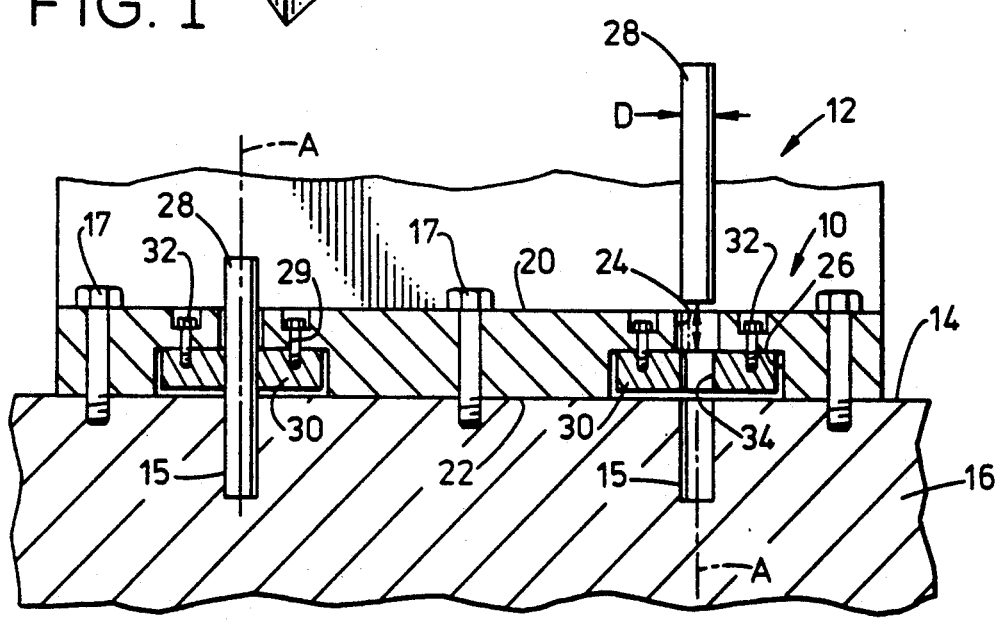
FIG. 2 is a partial cross-sectional view of the machine tool arrangement of FIG. 1, taken along line 2—2 thereof.
Figure 3:
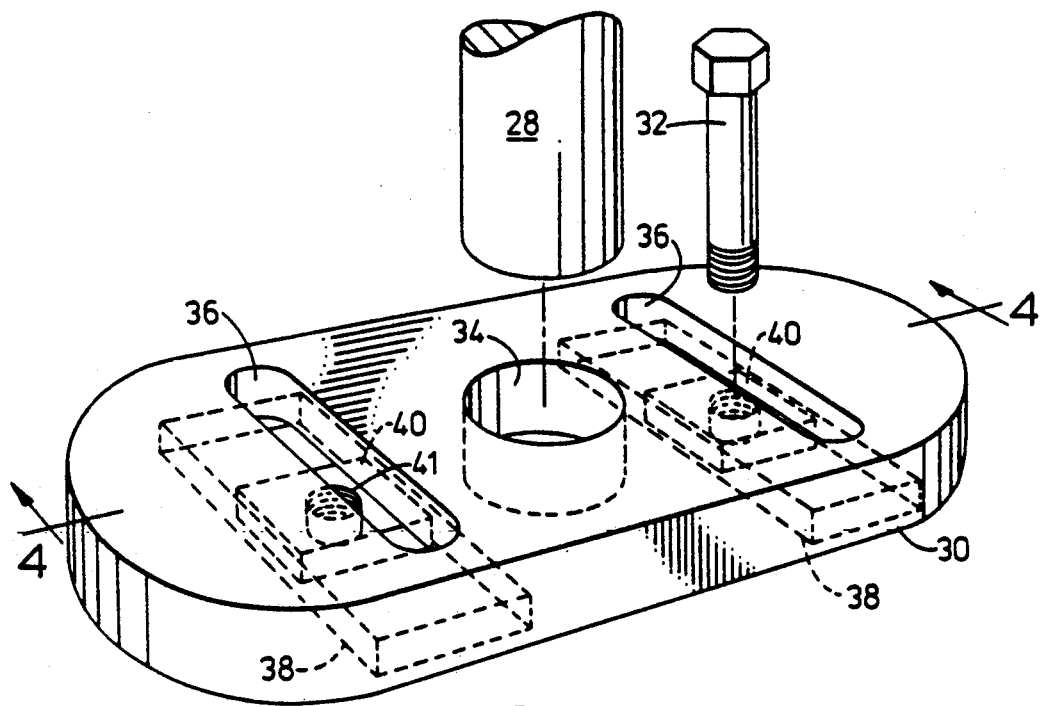
FIG. 3 is an enlarged perspective view of an adjustable alignment plate made in accordance with the present invention.
Figure 4:
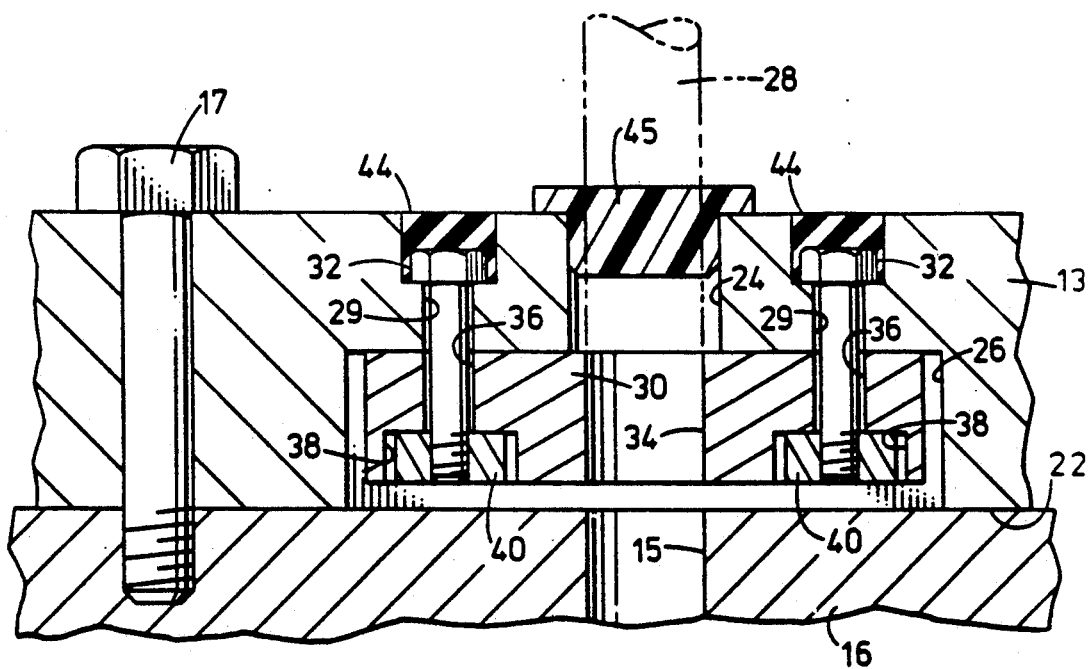
FIG. 4 is an enlarged, partial cross-sectional view depicting an adjustable assembly of the present invention as it might preferably appear after machine assembly and sealing procedures have been completed.

As best illustrated in FIGS. 2-4, adjustable assembly 10 comprises an alignment plate 30 situated in a clearance recess 26 machined into the bottom surface 22 of flange 13. Plate 30 is held in place by a pair of anchoring bolts 32 passing through flange 13, and through clearance slots 36 flanking either side of a precisely-machined central alignment bore 34. As seen best in FIG. 3, plate 30 may have a generally obround exterior conformation, and recess 26 might feature a corresponding shape. Clearance openings 38 in the bottom of plate 30 loosely receive nuts 40 and prevent relative rotation thereof as the bolts 32 are threaded into the nuts 40 through adjustment slots 36. The clearances permit the plate 30 to have a certain amount of "float" relative to module 12.

As will be understood, while it is preferred that alignment plate 30 be attached adjacent the lower surface 22 of flange 13 (e.g., to substantially isolate this part of assembly 10 from the hostile environment of machine operations and render it inaccessable to tampering), such location is not critical to its function. For example, alignment plate 30 could equally be situated adjacent the upper surface of the flange 13.

In use, a plurality of adjustable alignment plates 30 are loosely-held by bolts 32 and nuts 40, with their bores 34 in general alignment with access holes 24 of attachment flange 13. The access holes 24 being machined to an oversized, clearance dimension and having a relatively coarse spacing.

Once the module 12 has been precisely aligned upon mounting surface 14, by conventional methods, an alignment pin 28 is inserted into a respective access hole 24, through bore 34 of alignment plate 30, and into precisely machined alignment bore 15 of base element 16. Alignment pin 28 has a precise sliding fit with the alignment bores 15 and 34, and, due to the adjustable, "floating" nature of alignment plate 30 when it is loosely attached, the radial position of bore 34 easily finds its way into precise alignment with alignment bore 15 as the pin 28 is guided home. As an example of such fit, for cylindrical alignment pins 28, access holes 24 might be provided with a nominal diameter approximately 0.005" (about 1.25 mm) larger than the diameter of a pin 28. Such slightly oversized hole provides convenient access to enable adjustment of the position of bore 34 for precise registration with bore 15.

Once the hardened alignment pins 28 have been inserted, and bore 34 of alignment plate 30 is precisely aligned with its corresponding base alignment bore 15, alignment plate 30 can be secured in position by tightening anchoring bolts 32. Such tightening draws plate 30 upwardly and against plate mounting surface 27 within recess 26. Thereafter, alignment plate 30 maintains its preset alignment position until such time as anchoring bolts 32 are again loosened. As best seen in FIG. 4, plate mounting surface 27 is substantially parallel with module mounting surface 14 to facilitate the floating adjustment of plate 30 when loosely attached.

The alignment pins 28 can thereafter be removed from the aligned and anchored machine tool module 2. In most instances, it will be preferred to remove the alignment pins once module 12 is adequately secured to mounting surface 14 in order to save the pins from damage during use of the machine. Occasionally, inadvertent excessive forces are encountered during use of a machine, disturbing alignment of module 12. The absence of pins may thus function as a feature for preventing machine damage. In such case, when quick realignment of module 12 relative to mounting surface 14 is desired, bolts 17 are loosened, and the pins need merely be dropped back through alignment plates 30, into alignment bores 15, to re-establish the aligned position. If machine rebuilding affects dimensions of a module 12, or, if totally-different modules are to be substituted for the original module 12, the modules are simply pre-set at the factory to a master alignment fixture having a reference and mounting surface matching that of the machine, which may conveniently remain at a remote field site. The module is then shipped to the field site and easily installed.

The present adjustable assembly and method is adaptable to a variety of machine and alignment applications, and can be effectively isolated from the hostile environment of machine operations and protected from tampering. To this end, it is preferred that once the plates 30 have been aligned and tightened, the exposed heads of anchoring bolts 32 can be covered e.g., with caps, potting compound, silicon rubber caulking substance, or the like. FIG. 4 depicts the heads of the bolts 32 located in counterbores and potted with a compound (e.g., rubbery material) 44 which may be easily removed. To maintain cleanliness, a plastic plug 45 preferably covers the access hole 24 when not being utilized for alignment procedures. Such caps and covers facilitate exclusion of contaminants from the alignment assembly, and discourage tampering with the preset alignment plates.

Having shown and described the preferred embodiments of the present invention, further adaptions of the adjustable alignment assembly and method described herein can be accomplished by appropriate modifications by one of ordinary skill in the art without departing from the scope of the present invention. Several of these potential modifications have been mentioned, and others will be apparent to those skilled in the art. It should be understood that the present adjustable alignment assemblies and method can easily be utilized at a plurality of interface points in a single machine, thereby providing a simple and relatively universal alignment system. Accordingly, the scope of the present invention should be considered in terms of the following terms and is understood not to be limited to the details of structure and operation shown and described in the specification and drawings.

I claim:

1. An adjustable assembly for aligning a machine tool module on a module mounting surface of a machine base having at least one pin alignment bore with a central axis substantially normal to the module mounting surface, said assembly comprising:
   an attachment portion of said machine tool module, said attachment portion having a module attachment face received against said module mounting surface, said attachment portion also having a plate mounting surface substantially parallel with said module mounting surface;
   an alignment plate adjustably secured to said attachment portion, said alignment plate having a plate face retained against said plate mounting surface in use, and a precision bore extending therethrough along a central axis substantially normal to said plate face; and
   anchoring means for loosely securing said alignment plate to said attachment portion for adjustment relative thereto, and for tightly securing said alignment plate thereto once said precision bore is properly aligned with said pin alignment bore.

2. The adjustable assembly of claim 1, wherein said attachment portion further comprises a clearance recess within which at least a portion of said alignment plate is adjustably received for attachment to said attachment portion.

3. The adjustable assembly of claim 2, wherein said recess is located in the bottom surface of said attachment portion.

4. The adjustable assembly of claim 2, wherein said alignment plate is substantially fully received within said recess.

5. The adjustable assembly of claim 4, wherein said recess is located adjacent said bottom surface, with said anchoring means countersunk into said top surface and covered such that said adjustable assembly is effectively isolated from machining operations.

6. The adjustable assembly of claim 2, wherein said alignment plate comprises a pair of spaced slots for adjustably receiving a pair of anchoring means, whereby loose attachment of said anchoring means retains said plate in loose attachment with said attachment portion for alignment initial procedures.

7. The assembly of claim 1, further comprising a clearance space around said alignment plate after said plate is tightly secured to said attachment portion.

8. The assembly of claim 1, wherein said anchoring means is oriented relative to said alignment plate so as to hold said alignment plate against said plate mounting surface with clamping forces substantially normal to said plate face.

9. An adjustable assembly for aligning a machine tool module on a mounting surface of a machine base element having at least one pin alignment bore with a central axis substantially normal to the mounting surface when in assembled position, said assembly comprising:
   an attachment portion of said machine tool module to be aligned, said attachment portion having an access hole extending therethrough to said mounting surface when assembled, and a clearance recess having a plate mounting surface substantially parallel with said mounting surface;
   an alignment plate adjustably attached to said attachment portion within said clearance recess by at least one anchoring means, said alignment plate comprising a precision bore extending therethrough for alignment with an alignment bore of said base element and having a plate face retained against said plate mounting surface; and
   said anchoring means providing for loose attachment of said alignment plate to said attachment portion for adjustment relative thereto, and for tight attachment of said plate thereto once said precision bore is properly aligned with said alignment bore.

10. The adjustable assembly of claim 9, wherein said clearance recess is located adjacent said bottom surface of said attachment portion.

* * * * *